United States Patent [19]

McMillan

[11] Patent Number: 4,508,285

[45] Date of Patent: Apr. 2, 1985

[54] CABLE BRAKE

[76] Inventor: Robert E. McMillan, 171 Orange Rd., Montclair, N.J. 07042

[21] Appl. No.: 337,870

[22] Filed: Jan. 7, 1982

Related U.S. Application Data

[63] Continuation-in-part of Ser. No. 129,230, Mar. 11, 1980, Pat. No. 4,317,507.

[51] Int. Cl.³ .............................................. B65H 59/02
[52] U.S. Cl. ..................................... 242/99; 182/231; 242/156; 242/159; 242/173
[58] Field of Search ............ 242/99, 86.7, 86.64, 242/156, 156.1, 156.2, 54 R, 128, 129.8, 1, 47, 159, 173; 182/231, 232, 233, 236, 237, 238; 206/389, 397, 409, 460

[56] References Cited

U.S. PATENT DOCUMENTS

| 2,639,097 | 5/1953 | Scott, Jr. | 242/173 X |
|---|---|---|---|
| 2,973,911 | 3/1961 | Rayburn | 242/159 X |
| 3,089,588 | 5/1963 | Correll | 242/159 X |
| 3,783,180 | 1/1974 | Spicer | 242/173 X |

FOREIGN PATENT DOCUMENTS

| 2711860 | 9/1978 | Fed. Rep. of Germany | 242/159 |
| 2716647 | 10/1978 | Fed. Rep. of Germany | 242/159 |

Primary Examiner—Stanley N. Gilreath
Attorney, Agent, or Firm—Stephen E. Feldman; Nikolay Parada

[57] ABSTRACT

A cable or other linear length of flexible material, such as high strength wire, is initially wound on a reel, and is unwound by the application of a force, typically a movable object moving downwards through the air under the influence of gravity. The motion of the cable in unwinding from the reel is effectively braked, or slowed, by providing a cable brake system or systems which generate resistance to the unwinding of the cable. One system entails the provision of frictional control means consisting of a soft, tough, material matrix disposed about the reel, so that the cable is imbedded in the matrix. Payout of the cable, as the reel revolves, requires the cable to be torn out of the matrix. The other system entails immersing the reel, and associated cable wound on the reel, in a viscous fluid, so that the unwinding of the cable from the reel causes the reel to turn about its axis in the viscous fluid, thereby producing resistance to motion and a braking action.

15 Claims, 4 Drawing Figures

CABLE BRAKE

CROSS-REFERENCE TO RELATED APPLICATIONS

The present application is a continuation-in-part of U.S. patent application Ser. No. 129,230 filed Mar. 11, 1980, now U.S. Pat. No. 4,317,507.

BACKGROUND OF THE INVENTION

1. Field of the Invention

A cable brake system, to regulate the payout of a cable or the like, wound on a reel.

2. Description of the Prior Art

The general concept of braking the payout of a cable, or like linear length of flexible material, such as high strength wire, rope, fishing line cord, chain, etc., is quite important in numerous applications. One such application, as described in the cited parent of the present application, and also in French Patent No. 1,463,459, relates to the braking of a moving vehicle such as an automobile, to prevent collisions and other accidents. Another application, as described in U.S. Pat. No. 3,187,705, relates to a dynamic anchor for anchoring vessels afloat on the water. U.S. Pat. No. 2,973,911 deals with a method of handling wire, in which the coil of wire is initially disposed in a temporary resin binder. Still another application of braking the payout of a cable entails a frictional control device to be used as a slow-fall device, which may be useful for escaping burning buildings or other high places. Within this context, the braking of the payout of elevator cable has generated an extensive body of art. Certain automotive fluid drives and automatic transmissions, which include automatic transmission fluid as an integral component of the device, are amenable to usage as an ancillary or auxiliary braking medium when needed as such.

SUMMARY OF THE INVENTION

1. Purposes of the Invention

It is an object of the present invention to provide an improved cable brake system.

Another object is to provide a system for braking or otherwise regulating the payout of a cable or the like, wound on a reel.

A further object is to provide an improved system for controlling the payout from a reel of a linear length of flexible material such as cable, e.g. elevator cable, chain, high strength wire, rope, fishing line cord or other cord or string, etc.

An additional object is to effectively brake or slow down the motion of a cable or the like in unwinding from a reel, by providing a cable brake system which generates resistance to the unwinding of the cable.

Still another object is to provide a cable brake system which includes frictional control means consisting of a soft, tough, material matrix disposed about a reel on which the cable is wound, so that the cable is imbedded in the matrix and must be torn out of the matrix for payout of the cable as the reel revolves.

Still a further object is to provide a cable brake system in which the reel and associated cable wound on the reel is immersed in a viscous fluid medium, so that the unwinding of the cable from the reel is under frictional control, i.e. the unwinding of the cable from the reel causes the reel to turn in the viscous fluid, thus producing resistance to motion and a braking action.

Still an additional object is to provide a cable braking system where the braking force can be controlled.

Yet another object is to provide a cable braking system which can be used independently of a primary braking system, e.g. on a vehicle.

Yet a further object is to provide a cable braking system which can be quickly and easily activated.

Yet an additional object is to provide a cable brake system which is relatively inexpensive to manufacture.

An object is to provide a cable brake system for braking the payout of a cable which entails a frictional control device to be used as a slow-fall device, e.g. in which a movable object moves downwards through the air under the influence of gravity, the object being attached to a cable wound on a reel, with the weight of the object acting as a force to unwind the cable.

An object is to provide a cable brake system which may be useful for escaping burning buildings or other high places.

These and other objects and advantages of the present invention will become evident from the description which follows.

2. Brief Description of the Invention

In summary, the present invention entails a cable brake system in which a cable or other linear length of flexible material, such as high strength wire, is initially wound on a reel, and is unwound by the application of a force, typically the weight of a movable object attached to the cable and moving downwards through the air under the influence of gravity. The motion of the cable in unwinding from the reel is effectively braked, or slowed, by providing a cable brake system or systems which generate resistance to the unwinding of the cable. One system entails the provision of frictional control means consisting of a soft, tough, material matrix disposed about the reel, so that the cable is imbedded in the matrix. Payout of the cable, as the reel revolves, requires the cable to be torn out of the matrix. The other system entails immersing the reel, and associated cable wound on the reel, in a viscous fluid medium, so that the unwinding of the cable from the reel causes the reel to turn about its axis in the viscous fluid, thereby producing resistance to motion and a braking action.

In one embodiment, the frictional control device is associated with the reel to regulate the payout of the cable. This frictional control is a soft, tough, material matrix around the reel, with the cable imbedded therein, so that the payout of the cable requires the cable to be torn out of the material matrix. This soft, material matrix is preferably formed of materials such as solder, plastic, or resin, which are chosen to regulate the speed at which the cable is paid out. It is within the scope of the invention to use any desired type of material which is able to perform this function. The material matrix may be of graded toughness around the reel, such as with the toughness increasing from the outer periphery of the reel towards the center of the reel. The graded toughness causes, typically in the case of a moving object such as a motor vehicle, a relatively small deceleration force ("G") to be encountered by the occupant of the vehicle when the cable extends to an anchor and the anchor is first adhered to to road surface. This gives the occupant of the vehicle an opportunity to brace himself as the magnitude of the force increases when more of the cable is paid out from the tougher portion of the matrix. The cable is paid out at a slower speed as more of the cable is unwound from the reel.

In another embodiment, the frictional control device entails a wire or cable wound on a reel, with a viscous fluid matrix in or on the reel. Pulling the wire away from the coil or reel immersed in the viscous fluid must overcome viscous drag, when the coil or reel turns in the viscous fluid, i.e. the wire unwinds against a restraining force consisting of the matrix; in one embodiment, the wire coated with viscous material passes through an orifice which exerts resistance to movement of the wire. In other words, a reel or spool of wire or cable is mounted on an axle and is free to turn on bearings on the rod or axle. The spool or reel is immersed in a very viscous fluid, the wire being sent out of the viscous fluid medium by virtue of pulling force exerted on the cable or wire. The reel or spool turning in the viscous fluid produces resistance against the removing of the wire, hence a braking action.

In a preferred embodiment, the cable or wire exits through a restricted opening or orifice in going out of the viscous fluid. The restricted opening (orifice) interacts with the viscous fluid, providing further braking action. In other words, typically high strength wire, now coated with a layer of very viscous fluid, is fed through a restricted opening or orifice typically of a shape similar to the "olive" jewel in watchmaking and composed of very hard material such as sapphire, alumina or aluminum oxide, hard metal, etc. Very high viscous forces are developed, the force being directly proportional to the velocity of movement. An important aspect of this embodiment is that the force is proportional to the speed of withdrawing of the wire (for a fixed configuration and a fixed viscosity of fluid). A constant weight load will produce a constant velocity. A larger load will produce a larger velocity of wire withdrawal, so that it this device is used as a rescue device or as an escape device for various-weight persons, it would be designed so that the lightest load (person) would proceed at a slower, but adequate speed, whereas a larger person would proceed at a faster, but still safe speed.

The viscous fluid medium embodiment of the invention may be combined with the soft, tough, material matrix encapsulation as described supra, to provide a combination braking action. In any case, the present cable brake system is eminently useful as a slowfall device, which may be useful for escaping from a burning building or other high place.

Within the context of the present invention, the term "reel" will be understood to encompass and include not only a reel per se, but also a spool or a coil or the like. The term "cable" will be understood to encompass and include not only a cable per se, such as an elevator cable, but also a wire, e.g. a high strength wire, a chain, a cord such as fishing line cord, a rope, a thread, etc.; in other words, the term "cable" includes virtually any type of flexible linear length of material, usually of very high strength. The term "soft, tough, material matrix" will be understood to encompass and include solder, plastic or resin. The term "viscous fluid" or "viscous fluid medium" will be understood to encompass and include tar, hydraulic brake fluid, automatic transmission fluid, silicone oils, cornstarch, glucose, lithopone, asbestine, linseed oil, or a slurry of discrete, solid, particulate material suspended in a liquid carrier medium. The term "very hard material", of which the orifice is composed, will be understood to encompass and include sapphire, aluminum oxide, tungsten carbide, diamond, carborundum, and alloy steel. The term "movable object" will be understood to preferably consist of an object moving downwards through the air under the influence of gravity.

With regard to specific aspects of the present invention, in one embodiment, the present cable brake system includes a reel, a flexible cable means, and specific improved frictional control means associated with the reel. The reel has an axis and is rotatable about the axis but not displaceable, i.e. the reel is stationary, except for rotary movement, relative to an enclosure or container in which the reel may be disposed. The enclosure or container itself may of course be in motion, e.g. a moving vehicle such as an automobile. The cable means is wound about the reel.

The frictional control means associated with said reel regulates the payout of the cable and thus brakes the cable payout, and the movement away from the reel of a movable object attached to the cable means. The frictional control means includes a soft, tough, material matrix, the matrix being disposed about the reel so that the cable means is imbedded in the matrix, whereby the payout of the cable means as the reel revolves requires the cable means to be torn out of said matrix. The matrix is of a graded toughness around the reel, with the toughness increasing from the outer periphery of the reel towards the center of the reel, whereby the payout of the cable means, due to force of a given magnitude exerted on the cable means, is at a slower speed as more of the cable means is unwound from the reel, and so that a relatively smaller reel resistance is encountered when the force of a given magnitude is first exerted on the cable means.

In another embodiment of the present invention, the cable brake system includes a reel and a flexible cable means as before. However, in this alternate embodiment of the invention, the reel and associated cable means are immersed in a highly viscous fluid medium, so that the unwinding of the cable means from the reel causes the reel to turn about its axis in the viscous fluid, thereby producing resistance to motion and a braking action. Typically, the highly viscous fluid medium has a viscosity in centipoises at ambient temperature (e.g. 68° F.) in the range of about 100,000 to 1,000,000.

In a preferred embodiment, the cable means in this alternative embodiment extends through an orifice, the orifice having a restricted opening. In this case, the orifice generates additional frictional drag by stripping or wiping a coating or layer of viscous fluid from the outer surface of the cable means, as the cable means moves through the orifice. Typically in all cases of this alternate embodiment, the resistance to motion and the braking action regulates the payout of the cable, and thus brakes the cable payout and the movement away from the reel of a movable object attached to the cable means.

As mentioned supra, in a preferred embodiment of the invention, the highly viscous fluid medium embodiment may be combined with the soft, tough, material matrix encapsulation embodiment. In this case, a combination braking action will be provided with the viscous fluid medium configuration being combined with additional frictional control means associated with the reel, to regulate the payout of the cable and thus to brake the cable payout and the movement away from the reel of the movable object attached to the cable means. The additional frictional control means is a soft, tough, material matrix disposed about the reel, so that the cable means is imbedded in the matrix, whereby the payout of the cable means as the reel revolves requires the cable means to be torn out of the matrix. Within the context of this preferred embodiment, the matrix will preferably be of a graded toughness around the reel, with the toughness increasing from the outer periphery of the reel towards the center of the reel. Thus the payout of the cable means, due to a force of a given magnitude exerted on the cable means, will be at a slower speed as more of the cable means is unwound from the reel, with a relatively smaller reel resistance being encountered when the force of a given magnitude is first exerted on the cable means.

Additional preferred embodiments of the invention may be mentioned. Typically, the movable object is attached to the cable means by a swivel joint arrangement. With regard to the viscous fluid medium embodiment, typically the joint between the movable object and the reel immersed in the viscous fluid is sealed by an O-ring gasket, with this gasket circumscribing the cable means, and extending adjacent to and about the restricted opening of the orifice. Usually the movable object will be initially restrained by a threaded-fitting attachment to a stationary member, or an attachment to an enclosure means within which the reel is immersed in the viscous fluid. The movable object will usually include a circular handle, for opening a sealed closure between the movable object and the reel immersed in the viscous fluid. The handle is also used for attaching a weight or load to the movable object. Typically, when the reel is immersed in the viscous fluid medium, these elements will be disposed in an enclosure means. The enclosure means will generally converge to an elongated or tapered, usually lower end, with the orifice being mounted in the terminus, usually a lower or bottom terminus, of the elongated end of the enclosure means. Thus, this preferred configuration is of the nature of a pear-shaped form.

The invention accordingly consists in the features of construction, combination of elements, and arrangement of parts, which will be exemplified in the device and system hereinafter described, and of which the scope of application is as elucidated supra and as will be indicated in the appended claims.

BRIEF DESCRIPTION OF THE DRAWINGS

In the accompanying drawings in which are shown several of the various possible embodiments of the invention.

DETAILED DESCRIPTION OF THE PREFERRED EMBODIMENTS

Figure 1:
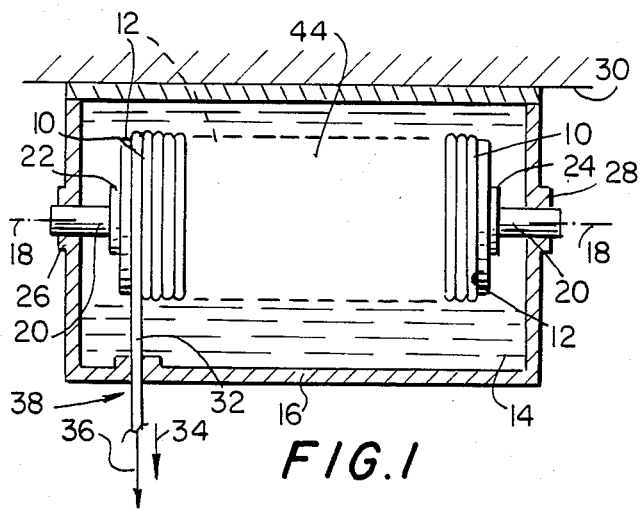
FIG. 1 is a sectional elevation view of one arrangement of the present cable brake system including a reel and a cable means immersed in various fluid.
Figure 2:
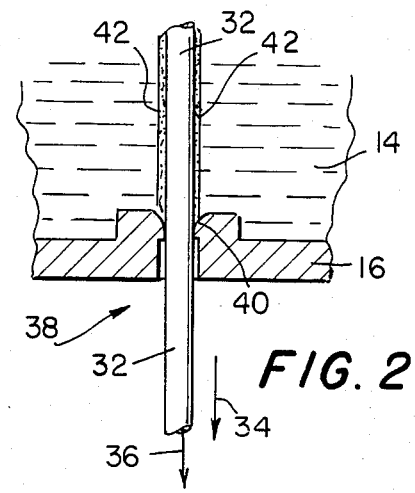
FIG. 2 is an enlarged sectional elevation view of a portion of the device of FIG. 1.

Referring now to FIGS. 1 and 2, the present cable brake system is characterized by the provision of a cable 10 wound on a cylindrical reel 12, all immersed in a body 14 of viscous fluid which is retained within a container 16. The reel 12 has a horizontal central longitudinal axis 18, which is also the axis of a shaft or axle 20 on which the reel 12 is coaxially mounted by means of bearings 22, 24 which allow the reel 12 to rotate. The shaft 20 is stationary and the bearings 22, 24 permit the reel 12 to rotate without displacement. The ends of the shaft 20 are mounted to the container 16 by means of fluid-impervious fittings 26, 28. The container 16 itself in secured to a stationary surface, e.g. a ceiling or roof 30.

As the cable portion 32 unwinds downwards from the reel 12, or in any linear direction as indicated by the arrow 34, and under the influence of force 36, which may be all or a component of the weight of a movable object moving downwards through the air under the influence of gravity, the cable passes through an orifice generally designated as 38 and having a restricted opening 40. As best seen in FIG. 2, the length of cable 32, while still within the body 14 of viscous fluid, has a film, layer or coating 42 of viscous fluid adhered thereto, which coating 42 is wiped off of cable 32 as the cable 32 progresses downwards through the constriction of restricted opening 40. This wiping action generates friction, which provides a braking effect to the cable brake system. A further braking effect may be obtained by providing the body 44 of reel 12 with a soft, tough, material matrix encapsulation (FIG. No. 1), in which the wound cable 10 is encapsulated, so that the unwinding of the cable 10 requires that it be torn out of the matrix. Thus in summary with regard to FIGS. No. 1 and 2, the reel 12, having wound thereon the cable means 10, is immersed in a body 14 of viscous fluid. The axle 20 having axis 18 extends to rotating bearings 22. The pulling of the cable or wire 32 away from the coil 12 must overcome the viscous drag of viscous fluid medium 14. The resultant turning of the coil 10 in the viscous fluid 14 must overcome drag. Further, as shown in FIG. 2, the cable or wire 32, now coated with a layer 42 of very viscous fluid, is fed through a restricted opening 40 of the orifice 38 and very high viscous forces are developed. The force is directly proportional to the velocity of movement.

Figure 4:
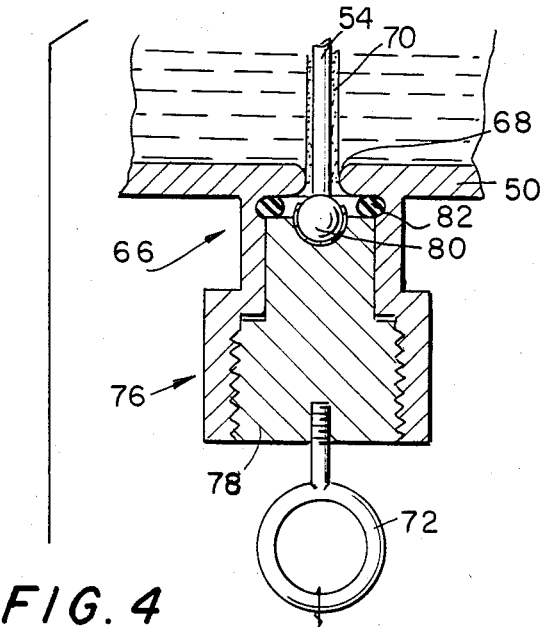
FIG. 4 is an enlarged sectional elevation view of a portion of the device of FIG. 3, showing displacement of the movable object and cable means in phantom outline.
Figure 3:
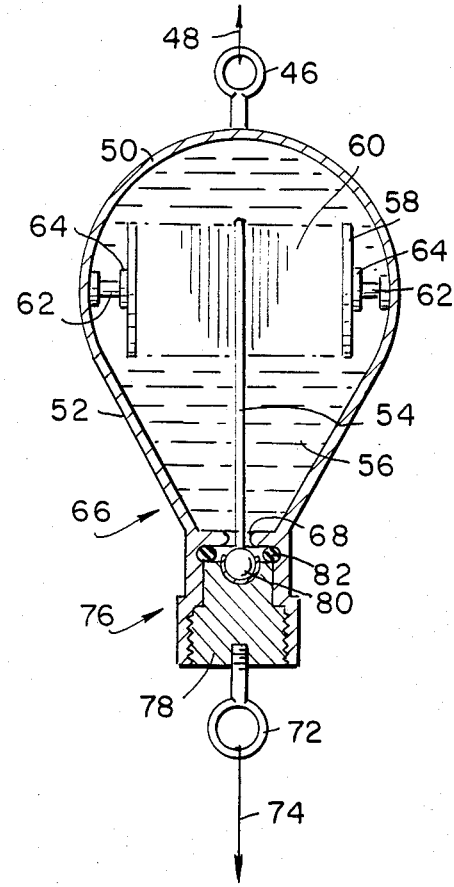
FIG. 3 shows, in sectional elevation view, an alternative embodiment of the present cable brake system including a reel and a cable means immersed in a viscous fluid, within the scope of the present invention.

FIGS. 3 and 4 show details of an alternative preferred embodiment of this invention, especially useful in facilitating the descent and escape of persons from burning buildings and other high places. The body of the device is secured via upper ring anchor 46 to an upper attachment, as indicated by arrow 48, to a firm anchor to a ceiling, roof, wall or beam of a building. In this embodiment, the container 50 of the device is of inverted pear shape, with the lower end 52 being elongated to diminish the maximum angle of the path of travel of the cable length 54 through the body 56 of viscous fluid to a minimum. The device of FIGS. 3 and 4 has, as before, a reel 58 on which a cable coil 60 is wound, the reel being mounted on axle 62 via journals or bearings 64, to permit rotation of reel 58. The cable 54, as before, exits through a lower orifice generally designed as 66 and having a restricted opening 68 which works against the film, layer or coating 70 (FIG. 4) of viscous fluid, wiping off layer 70 and thereby generating friction and exerting a braking action. However, various additional appurtenances, mechanical features and structural elements to be preferably provided in practice are shown in FIGS. 3 and 4. Thus, this embodiment includes a lower handle 72 for attaching a load which exerts a force 74, and for opening a seal assemblage generally designated as 76 and including a threaded coupling 78, a ball-joint swivel arrangement 80, and O-ring 82. The phantom outline in FIG. 4 shows the direction of downwards travel of the handle 72 and associated elements, as indicated by arrow 84. Typically in the case where a person is escaping from a burning high building, such as an office building, the handle 72 extends to a harness which fits about the person's body and supports the person for safe, controlled and gradual descent from the building, by virtue of the present cable brake system.

In this regard, an important point should be made concerning the present device. Since force is proportional to speed of withdrawing of the cable or wire (for a fixed configuration and a fixed viscosity of fluid), a constant weight load will produce a constant velocity. A larger load will produce a larger velocity of wire withdrawal, so that if the present device is used as a rescue device or as an escape device for various weight persons, it would be designed so that the lightest load (person) would proceed at a slower, but adequate, speed, whereas a larger person would proceed at a faster, but still safe, speed. Likewise the design would accommodate some expected change of the fluid's viscosity with temperature. Hence the device is not a constant force device. The combination of a bonded wire with an exit through viscous fluid typically will provide minimum force to move the wire, with increasing force with greater velocity.

It thus will be seen that there is provided a cable brake as a system and device which achieves the various objects of the invention and which is well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense. Thus, it will be understood by those skilled in the art that although preferred and alternative embodiments have been shown and described in accordance with the Patent Statutes, the invention is not limited thereto or thereby, since the embodiments of the invention particularly disclosed and described herein above are presented merely as an example of the invention. Other embodiments, forms and modifications of the invention coming within the proper scope and spirit of the appended claims will, of course, readily suggest themselves to those skilled in the art.

What is claimed is:

1. A cable brake system comprising:
   (a) a generally closed container means;
   (b) reel axle means coupled to said container means at opposite ends thereof and having a longitudinal axis;
   (c) a reel, said reel having an axis, said axis of said reel being co-extensive with the axis of said reel axle means, said reel being carried by said axle means and rotatable about said axle means axis but not displaceable along said reel axle means;
   (d) a flexible cable means, said cable means being wound about said reel; and
   (e) a viscous fluid filling said container means immersing said reel and associated cable means in said viscous fluid, so that the unwinding of said reel causes said reel to turn about said axle means axis in said viscous fluid, thereby producing resistance to motion and a braking action.

2. The cable brake system of claim 1 in which the viscous fluid is selected from the group consisting of tar, hydraulic brake fluid, automatic transmission fluid, silicone oil, cornstarch, glucose, lithopone, asbestine, linseed oil, and a slurry of discrete, solid, particulate material suspended in a liquid carrier medium.

3. The cable brake system of claim 1 in which the viscous fluid has a viscosity in centipoises at ambient temperature in the range of about 100,000 to 1,000,000.

4. The cable brake system of claim 1 in which the cable means extends through an orifice in said container means having a restricted opening, said orifice generating frictional drag by stripping or wiping a coating or layer of viscous fluid from the outer surface of said cable means as said cable means moves through said orifice.

5. The cable brake system of claim 4 in which the orifice is composed of a very hard material selected from the group consisting of sapphire, aluminum oxide, tungsten carbide, diamond, carborundum, and alloy steel.

6. The cable brake system of claim 1 in which the resistance to motion and the braking action regulates the payout of the cable, and thus brakes the cable payout and the movement away from said reel of a movable object attached to said cable means.

7. The cable brake system of claim 6 in which the movable object is an object moving downwards through the air under the influence of gravity.

8. The cable brake system of claim 4 in which the resistance to motion and the braking action regulates the payout of the cable, and thus brakes the cable payout and the movement away from said reel of a movable object attached to said cable means.

9. The cable brake system of claim 8 in which the movable object is an object moving downwards through the air under the influence of gravity.

10. The cable brake system of claim 9 in which the movable object is attached to the cable means by a swivel joint arrangement.

11. The cable brake system of claim 10 in which the joint between the movable object and the reel immersed in the viscous fluid is sealed by an O-ring gasket, said gasket circumscribing the cable means and extending adjacent to and about the orifice.

12. The cable brake system of claim 9 in which the movable object is initially restrained by a threaded fitting attachment to a stationary member, or to said container means in which the reel is immersed in the viscous fluid.

13. The cable brake system of claim 9 in which the movable object includes a circular handle for opening a sealed closure between the movable object and the reel immersed in the viscous fluid, and for attaching a weight or load to the movable object.

14. The cable brake system of claim 4 in which the reel is immersed in the viscous fluid in said container means, said container means converging to an elongated end, said orifice being mounted in the terminus of the elongated end of said container means.

15. The cable brake system of claim 1 in which the cable means consists of high strength wire.

* * * * *